United States Patent [19]
Dutton et al.

[11] Patent Number: 6,034,205
[45] Date of Patent: Mar. 7, 2000

[54] THERMOPLASTIC POLYMERS

[75] Inventors: Amanda J. Dutton, Great Sankey; Robert C. Wasson, Barnston, both of United Kingdom

[73] Assignee: Solvay (Societe Anonyme), Brussels, Belgium

[21] Appl. No.: 09/120,847

[22] Filed: Jul. 23, 1998

[30] Foreign Application Priority Data

Jul. 25, 1997 [GB] United Kingdom .................. 97.15603

[51] Int. Cl.[7] .................................................. C08G 63/08
[52] U.S. Cl. .............................................................. 528/354
[58] Field of Search ............................................ 528/354

[56] References Cited

U.S. PATENT DOCUMENTS

| | | | |
|---|---|---|---|
| 4,045,418 | 8/1977 | Sinclair | 260/78.3 |
| 4,057,537 | 11/1977 | Sinclair | 260/78.3 |
| 5,088,598 | 2/1992 | Iguchi . | |
| 5,225,521 | 7/1993 | Spinu | 528/354 |
| 5,292,859 | 3/1994 | Ford | 528/354 |
| 5,639,851 | 6/1997 | Bezwada | 528/354 |
| 5,688,900 | 11/1997 | Cooper | 528/301 |
| 5,714,551 | 2/1998 | Bezwada | 525/411 |
| 5,736,589 | 4/1998 | Cooper | 522/43 |
| 5,824,333 | 10/1998 | Scopelianos | 424/423 |

FOREIGN PATENT DOCUMENTS 021704  9/1989  Japan .

OTHER PUBLICATIONS

"Ingenierie Moleculaire de Materiaux Biocompatibles et Biodegradables par Ouverture de Cycle de Lactones et Lactides" [translation:Molecular Study of Biocompatible and Biodegradable Material by Opening of the Lactone and Lactide Rings], Dissertation by Philippe DuBois, University de Liege, 1990–1991.

*Primary Examiner*—Paul R. Michl
*Attorney, Agent, or Firm*—Venable

[57] ABSTRACT

Products intended for use as hand mouldable materials should meet the objectives of not causing pain to the user when held in the hand, and retaining malleability for a sufficient but not excessive length of time.

The invention hand-mouldable compositions comprise selected copolymers of lactones and lactides which manifest a melt temperature $T_m$ in the range of from 48 to 58° C. and a crystallisation temperature $T_c$ in the range of from 16 to 30° C. They are preferably produced from $\epsilon$ caprolactone and L-lactide, most desirably in a weight ratio of from 94:6 to 91:9, and especially at a reaction temperature in the range of from 150 to 190° C. They are often coloured and can be employed in kits.

26 Claims, No Drawings

THERMOPLASTIC POLYMERS

The present invention relates to thermoplastic polymers, particularly to polymers of monomers comprising one or more hydroxyacids, their lactones, or cyclic dimeric ester of the hydroxyacid, and especially to polymers which are capable of being moulded by hand.

Thermoplastic polymers find use in a wide number of applications. This is partly due to the property which they possess of becoming soft and mouldable on heating, but retaining their moulded shape on subsequent cooling and hardening. One application comprises hand modelling or moulding materials, including their use in recreational or other modelling kits. In this application, the materials are characterised by being solid at ambient temperature, but soften at moderately elevated temperatures to enable moulding under hand-pressure. Typically, the material is softened by means of gentle heating until it is observed to have softened, and whilst in this softened state is moulded to the desired shape, often by hand. It is then cooled or allowed to cool to ambient temperature where it hardens and retains the moulded form.

A critical characteristic of hand mouldable materials is their softening temperature. It needs to be low enough for the material not to burn or cause undue discomfort when it is in contact with the human hand during the moulding operation. On the other hand, the softening temperature needs to be high enough above the usually anticipated ambient temperature for the moulded material to substantially retain the moulded shape. Furthermore, it is also important that the hardening time of the material is long enough to enable the material for it to be moulded into the desired shape, because a very short hardening time would limit the range of mouldings that could be used with material. The hardening time should not be excessively long, because otherwise there is a risk that the moulded material would deform under its own weight before it had set, or the material would need to be held in shape for an excessive length of time, which would be unacceptable to many users and especially to those who are impatient or have a short attention span such as younger children.

In addition, the selection of material for use as hand mouldable kits in practice usually seeks to take into account a number of other considerations beyond the temperature at which the material softens sufficiently for moulding and the length of time that it remains mouldable. These considerations include safety considerations, including the toxicity of the material, both when in contact with the skin or if ingested, and environmental considerations such as the potential release of constituents from the material into the atmosphere or the leaching of constituents. In some countries, these considerations have been codified into legislative and/or industrial standards.

Many polymers have melt temperatures which are too high to be used as hand mouldable materials. In other words, they do not become soft enough to be moulded until they attain a temperature which would cause pain or significant discomfort when in contact with human skin during hand manipulation. Some polymers soften at such a high temperature that there is little chance that they could form the basis of a hand-mouldable material, but some other polymers can be selected which soften at a temperature that is somewhat too high without being modified, but are worth investigating to determine whether means could be found for their modification that would satisfy to an acceptable extent the criteria for hand mouldable materials.

In order to achieve the sought after lower softening temperature, though not necessarily with the intention of creating a hand-mouldable material, a number of different methods have been proposed. One of the most common ways is by incorporation of a plasticiser into the polymer. Their incorporation allows the manufacturer to tailor the melting point of a particular polymer to a certain extent. A large number of plasticisers are, however, relatively small molecules, and hence possess a fair degree of mobility within the polymer structure. This means that they can easily migrate within or even out of the bulk polymer phase, with the following consequences. Redistribution within the bulk phase carries the risk that some fractions of the material will contain too much plasticiser and thus soften at too low a temperature and the rest of the material would accordingly be depleted with respect to plasticiser, with the result that its softening temperature increases. Migration out of the bulk phase progressively on re-use of the material increases the risk that the mouldable material would not soften until its temperature caused discomfort to the use. Furthermore, plasticiser release would normally occur during the heating of the material and thus in undesirably close proximity to the user. Some of the most important and effective plasticisers, for example phthalates, can have an irritant effect on the skin; something which is obviously undesirable, where the polymer is expected to be handled.

Another method of lowering the softening point of a thermoplastic polymer is provided by melt blending it with a compatible polymer, possibly having a significantly lower molecular weight. However, this method increases the processing costs in that the blend often needs to be heated to a much higher temperature than is needed for softening, in order to lower the viscosity of the blend to a point at which it can be easily mixed. Alternatively, the blends, if they are not properly mixed, can suffer from the problems of inhomogeneity as indicated above for plasticisers.

Classes of polymers which have been contemplated for use as hand mouldable materials comprise polymers obtained by polymerisation of hydroxyacids, their lactones, or cyclic dimeric ester of the hydroxyacid of which one sub-class comprises polycaprolactones, which have softening temperatures that are a little in excess of the desired range for that purpose.

JP 01197548 teaches lowering the softening temperature of poly(caprolactone) by the addition of a styrene/acrylonitrile copolymer. U.S. Pat. No. 5,088,098 teaches using a thermoplastic resin which can be moulded at temperatures from about 60° C. upwards. The thermoplastic resin can be polycaprolactone, a blend of polycaprolactones of different molecular weights, or polycaprolactone mixed with additives such as chlorinated paraffins or chlorinated polyethylene. In both of these disclosures the change in melt temperature of the material is obtained by blending, and thus they do not offer guidance on circumventing or overcoming the difficulties or disadvantages associated with blending.

In addition U.S. Pat. No. 5088098 teaches the use of materials for hand moulding having a softening temperature which is higher that that advocated in current industry standards, which suggest that their maximum acceptable softening temperature should not be higher than 35° C. above ambient, which means in practice an upper limit that is less than about 60° C. Furthermore, chlorinated paraffins or chlorinated polyethylene as described in U.S. Pat. No. 5,088,098 are not easily biodegradable, so that it would be preferable to find alternative additives.

In a doctoral thesis entitled "Ingenierie Moleculaire de Materiaux Biocompatibles et Biodegradables par Ouverture de Cycle des Lactones et Lactides", which was not concerned expressly with hand mouldable compositions, P Dubois has disclosed in one passage that the melt temperature of poly(caprolactone) may be lowered if it is polymerised in the presence of lactide at a reaction temperature of 70° C. in toluene. However, the thesis does not offer any guidance on whether a product so formed might have application in hand mouldable compositions. For example, it does not contemplate whether the product, if heated to softening point rather than melted and then removed from the source of heat, would retain its softened, malleable state for a suitable length of time for such a use or whether polymeric materials would separate.

It is an object of the present invention to provide new or improved hand-mouldable materials.

According to the present invention, there is provided a hand-mouldable material having a softening temperature of less than 60° C., characterised in that the material comprises a thermoplastic polymer selected from copolymers of a) a lactone or corresponding aliphatic hydroxyacid, and b) cyclic dimeric ester of an α-hydroxyacid or the corresponding α-hydroxyacid which have a melt temperature $T_m$ in the range of from 47 to 58° C. and a crystallisation temperature $T_c$ in the range of from 15 to 30° C.

The crystallisation temperature, $T_c$ represents a convenient, measurable parameter on which to assess whether or not the hardening times of a polymer is suitable to enable the material to be employed for hand-moulding and hence, in conjunction with melting point represents a suitable basis for selecting hand mouldable material. $T_c$ herein is defined as the temperature at which the rate of crystallisation reaches a maximum before decreasing as the melt viscosity increases. It is believed that on cooling down from above its melt temperature, the crystallisable segments of a polymer crystallise out from a disordered aggregate of molecules, and the polymer becomes hard, and as a consequence more difficult to mould. The $T_c$ is measured in Perkin-Elmer DSC4 thermal analyser in which a sample is heated for 5 minutes at a rate of 10° C. min$^{-1}$ its temperature is maintained for a further 2 minutes and is then cooled, for the first 2 minutes at a rate of 20° C. min$^{-1}$ and thereafter at 2° C. min$^{-1}$. If the $T_c$ is too high then the polymer tends to set too quickly and be very difficult to mould. If, on the other hand, it is too low then, at ambient temperatures prevalent in domestic or office environments, the polymer will remain soft and tacky for an unduly prolonged period of time before setting and the more extreme polymers may hardly set at all.

The polymeric material according to the invention herein is in essence a copolymer of at least one lactone moiety and at least one cyclic dimeric ester of an α hydroxyacid moiety, otherwise referred to herein as a lactide, or their respective hydroxyacids from which the lactone(s) and lactide(s) can be made. The lactone in a) is preferably a γ, δ or ε lactone, which may be unsubstituted or one or more alkyl substituted from C1 to C6. Substitution, if present, often occurs at the hydroxyl-bearing carbon in the lactone. The lactone is more preferably selected from the group consisting of γ-butyrolactone, γ-valerolactone, δ-valerolactone, ε-caprolactone and trimethylcaprolactone and stereoisomers thereof, of which an especially preferred lactone is ε-caprolactone, in view of commercial availability. The lactide in monomer b) can be a glycolide diester, either unsubstituted or C1–C6 alkyl substituted, of which an especially preferred lactide comprises L-lactide. It is most particularly preferred that the polymer is obtained by the polymerisation of ε-caprolactone and L-lactide.

The weight ratio of lactone to lactide monomer employed to produce the copolymer is often selected in the range of from about 96:4 to about 87:13, and especially when employing ε-caprolactone and L-lactide and preferably in the range of from 95:5 to about 90:10. A particularly preferred range is from 93:7 to 91:9.

The number average molecular mass of the lactone-lactide copolymer, $M_n$, is desirably selected in the range of 30,000 to 120,000. A preferred range for this parameter is 40,000 to 100,000. It has been found to be particularly preferred to use polymers with $M_n$ between 50,000 and 80,000.

By employing of a suitably selected weight ratio of lactone to lactide, and particularly in conjunction with a copolymer having a suitably chosen high molecular weight, it is possible to select copolymers which are especially well suited for use as hand mouldable materials, in that the melt/softening temperature of the polymer is lowered sufficiently compared with high molecular weight polycaprolactone to provide a margin of safety compared with the temperature at which the human body would encounter pain, whilst at the same time not lowering the crystallisation temperature to such an extent that its hardening time is unduly prolonged.

For many preferred materials, the copolymer has a melt temperature $T_m$ in the range of from 51 to 55° C. and a crystallisation temperature $T_c$ in the range of from 19 to 25° C.

According to a further aspect of the present invention there is provided a method for the selection of polymeric material for use as hand-mouldable material which is characterised by first selecting a high molecular weight copolymer of a lactone and a lactide, measuring its melt temperature $T_m$ and crystallisation temperature $T_c$ and retaining for such use material which has a melt temperature $T_m$ in the range of from 47 to 58° C. and a crystallisation temperature $T_c$ in the range of from 15 to 30° C.

According to a yet further aspect of the present invention there is provided a process for the preparation of co-polymers of a lactone and a lactide suitable for use as hand mouldable material which comprises the steps of:

(i) forming a reaction mixture from a lactone and a lactide in a weight ratio of from 96:4 to 87:13 together with an initiator (ii) introducing an esterification catalyst;

(iii) heating the reaction mixture and maintaining it at an elevated temperature until both the lactone and lactide are consumed thereby forming a polymer reaction product and (iv) cooling or allowing the reaction mixture to cool until the reaction product solidifies.

In step (i) the mixing of the lactone, lactide and initiator is often carried out with agitation at a temperature of from ambient to 100° C. and in many instances at above 60° C. The lactide can be introduced into a pre-mixture of the lactone and initiator or all three can be mixed at the same time. to prior to the introduction of the catalyst. Step (i) often lasts for a period of from 30 minutes to 3 hours during which time, if desired, the mixture can be sparged with an inert gas such as nitrogen, preferably at reduced pressure.

In step (ii), which is usually conducted at ambient pressure, the catalyst is often introduced and blended into the mixture at the same or preferably a higher temperature than in step (i). It is preferably introduced at a temperature of from 110° C. to 130° C.

Step (iii) is normally carried out at a temperature equal to or higher than that in step (ii). It is preferably carried out at a temperature of above 130° C. and especially at a temperature selected in the range of from 150° C. to 190° C. The duration of step (iii) is usually selected in the range of from about 6 to 48 hours, and preferably from 12 to 30 hours.

The lactone and lactide monomers employed in step (i) are preferably selected as described hereinbefore.

The initiators in step (I) are usually selected from low molecular weight compounds containing one or more of the following functional groups, —OH, —NH$_2$, =NH, —SH, and CO$_2$H. Suitable amines which can be used are 3,3'-dichloro-4,4'-diaminodiphenylmethane, 4,4'-diaminodiphenylmethane, 1,4-diaminobenzene, 3,3' dimethoxy-4,4' diaminobiphenyl, 3,3'-dimethyl-4,4'-diaminobiphenyl, 4,4'-diaminobiphenyl, and 3,3'-dichloro-4,4'-diaminobiphenyl. Suitable hydroxy compounds include, mono-ols such as cetyl alcohol, diols such as ethyleneglycol, propyleneglycol, 1,3-propanediol, 1,4-butanediol, 1,5-pentanediol, neopentylglycol, 1,6-hexanediol, 3-methyl-1,5-pentanediol, 1,9-nonanediol, diethyleneglycol, dipropyleneglycol, polyethyleneglycols, polypropyleneglycols, polyethylene adipate, polybutylene adipate, polycaprolactonediol, polycarbonatediol, cis-2-butene-1,4-diol, 1,4-butynediol, 1,4-dihydroxy-1,2,3,4-tetrahydronaphthalene, 1,5-bis(β-hydroxyethoxy) naphthalene, α,α'-dihydroxyxylene, and polyhydric alcohols such as trimethylolpropane, hexanetriol, pentaerythritol, sorbitol, sucrose, dipentaerythritol, ditrimethylolpropane, and tri-alkanolamines. Suitable thiols include alkylthiols containing from 2 to 12 carbon atoms, and from 1 to 6 thiol groups where the alkyl moiety may be either linear or branched. Also to be contemplated are aromatic thiols containing up to 3 aromatic rings and from 1 to 4 thiol groups. Preferred chain extenders are diols and especially, 1,4-butanediol, diethyleneglycol, and neopentyl glycol. The initiator is often employed in an amount chosen in the range of from 1 part per 100 parts to 2 parts per 10000 parts by weight of the reaction mixture and particularly from 1 to 4 parts per 1000 parts. It will also be recognised that a mixture of initiators may be employed when necessary.

The reaction catalyst introduced in step (iii) is usually added as such or optionally pre-dissolved in a suitable solvent such as toluene or like aromatic hydrocarbon. It is often selected from the group comprising polyamine compounds, phosphine oxides and metal carboxylates, including especially tin or alkylated tin carboxylates. Examples of suitable catalysts are triphenylphosphine oxide, 1,4-diaza(2,2,2) bicyclooctane, tetramethylbutanediamine, triethylenediamine, dibutyltin dilaurate, stannous octanoate and stannous 2-ethylhexanoate. Preferred catalysts are dibutyltin dilaurate, stannous octanoate and stannous 2-ethylhexanoate. The catalyst is normally employed in an amount selected in the range of from 1 to 50 parts per 10000 parts by weight of the reaction mixture, and especially in the range of from 4 to 15 parts per 1000 parts.

By the use of a process as described herein for the polymerisation, in which the catalysed reaction is carried out at a temperature above 130° C. and particularly in the range of 150 to 190° C., the resultant product is essentially a random copolymer of lactone and lactide. Such a product has been found to exhibit the properties of softening in a suitable temperature range and remaining mouldable for a sufficient and suitable period of time to enable the product to be used as a hand-mouldable material.

In order to enhance their appeal and to offer additional functionality, it is usually desirable to incorporate a pigment or colouring agent in an amount sufficient to impart a visible colouration in the invention polymer materials intended for use as hand mouldable materials, and particularly those intended for are use in modelling or display kits. The selection of such pigment or colouring agent can be made from the range of pigments or colouring agents known or proposed for use in polyesters. These may include some of the so-called acid dyes, especially those chosen from the group comprising azo-dyes(including pre-formed metal complexes, and anthraquinones. Among those which may be contemplated from this group are BAFIXAN™, INTRAMIN™. Alternatively the dye can be aqueous insoluble. In this case, the dye is usually provided as a dispersion in water, although emulsions of such compounds dissolved in organic solvent may also be employed. As examples of such water insoluble dyes, the following can be noted, CELLITON™, PALANIL™, FATAGEN™, TERAPRINT™, TERSASIL™, FORON™, TERTRANESE P™, TERTRANESE N™, RESOLIN™, SAMARON™, LANTOSIL™, POLYCROM™, SUPRACET™, HISPERSE™, SERILENE™, SERISOL™, and DISPERSOL. In practice, the pigment and colouring agent is usually chosen so as to avoid poisonous or toxic substances. The amount of pigment or colouring agent is at the discretion of the user and depends on the intensity of the colouring that is desired, but is preferably selected in an amount within the conventional range for incorporation in polyester materials, such as in the range of from 0.1–5% by weight of polymer.

In practice, for employment in a kit, a set of differently coloured invention materials is often employed, including two or more from white, red, green, blue, purple, yellow, orange, brown and black.

The pigment or colouring agent is usually incorporated into the material by blending it in to pre-formed polymer. The incorporation step is often performed by heating solid material until it melts, introducing the pigment or colouring agent and blending the mixture until an even distribution has been achieved. Alternatively, the blending can take place during the cooling phase of the polymer production, being introduced whilst the polymer has a temperature of at least about 60°0 C. and often below about 80° C.

For use in kits, the selected, optionally coloured, material can be supplied separately from or the kit can contain both the material and a range of moulds. The moulds are designed to appeal to the intended user of the hand-mouldable material. Thus, if the kit is intended for use by childrenthe moulds can, amongst other shapes, include jewellery, animals, such as farmyard or wild animals, fruit, trees, games pieces, cartoon characters, or modes of transport such as car, lorry, boat or plane. The mould can be flexible so as to enable it to be peeled away the moulded material after the latter has set.

The kit will normally also include a set of instructions on how to employ the material. These instructions will typically specify that the material in a suitable heat transmitting receptacle which is placed in a pan of water that has or is heated to a temperature in excess of 60° C. The form of the material is monitored, and the receptacle is removed from the heat when it visibly softens. The material is then ready for hand moulding. In operation, the material in the softened state is either pressed firmly into a mould, with excess material being removed by hand or by use of a knife, or is hand moulded using the skill and expertise of the moulder to create the shape with his or her hands or by application of selected tools that are pressed onto the surface of the material to form an impression which remains intact when the tool is removed.

Having described the invention in general terms, specific embodiments thereof are now described in greater detail solely by way of example.

In the Examples, the analyses were carried by the methods below.

Thermal Analysis

Melt Temperature ($T_m$) and Crystallisation Temperature ($T_c$)

Thermal analysis of the samples was carried out on a Perkin-Elmer™ DSC 4, with data analysis by DSC-3 (LabView™ for Macintosh™). The sample was heated for 5 minutes at a rate of 10° C. min$^{-1}$, and then held at the achieved temperature for a further 2 minutes. The sample was then cooled initially at a rate of 20° C. min$^{-1}$ for 2 minutes, and subsequently at a rate of 2° C. min$^{-1}$.

Glass Transition Temperature ($T_g$)

This was carried out on a DuPont™ DSC with T.A.Instruments™ 2000 computer and controller including software for peak analysis. The sample (20 mg) was placed in the bottom of the sample pan, and the lid sealed using an encapsulating press. The sealed sample was put on one of the thermocouples in the DSC head and a reference sample ($Al_2O_3$) also in a sealed pan, was put on the other thermocouple. The sample and reference were cooled by means of a mechanical cooling device to −80° C. Heating at a constant rate of 20° C./minute was then applied from −80° C. to 200° C. and the energy output/intake measured. The sample was then dropped into liquid nitrogen, and the cell head cooled to <10° C. the sample was then placed back into the cell head, and the cell head cooled to −80° C. Heating was then again applied at a constant rate of 20° C./minute from −80° C. to 200° C. and the energy output/intake again measured.

Proton Nuclear Magnetic Resonance (n.m.r.) Spectra

Proton n.m.r. spectra were measured using a Bruker AMX500 spectrometer at 500 MHz, using solutions of ~10–20 mg polymer solubilized in 0.5 ml deuterated chloroform ($CDCl_3$) (Reference peak at 7.3 ppm), taking 16 scans.

Mould Characteristics

The mould characteristics were tested by placing a sample of the material in a glass beaker placed in a pan of water that was at or close to its boiling point. When the material was observed to be melting, it was removed from the heat and assessed for suitability by holding in the hand. The physical characteristics of the softened material were then observed qualitatively.

EXAMPLE 1

In Example 1, ε-Caprolactone (474.2 g) and 1,4-butanediol (0.9029 g) were charged to a stirred reactor and sparged under vacuum. The mixture was then heated to 80° C. and L-lactide (24.96 g) added. The temperature was increased to 120° C. and 1 ml of a solution of stannous octoate (0.3936 g) in toluene (10 ml) added. The temperature of the reaction mixture was further increased to 180° C., and maintained at this temperature for about 17 hours. When the reaction was complete the mixture was poured into a clean metal tray—which had been sprayed with mould release-agent and then cooled to ambient.

The melt temperature, crystallisation temperature and glass transition temperature of the polymeric material were measured as indicated above, and were found to be as follows:

$T_m=57°$ C.

$T_c=28°$ C.

$T_g=-49°$ C.

Analysis of the polymer indicated that it was derived from 95.4% w/w caprolactone and 4.6% w/w lactic acid.

The material was found not to inflict pain on the human hand when held at a temperature around which it becomes hand-mouldable. The material took a relatively short time to harden which it was assessed was close to the minimum that it would be desirable for use in hand mouldable materials.

EXAMPLE 2

ε-Caprolactone (459.21 g), L-lactide (39.9 g), and 1,4-butanediol (0.9055 g) were charged to a reaction vessel. The mixture was then heated to 80° C., and held at this temperature for one hour under vacuum. The vacuum was released with nitrogen, the mixture heated to a temperature of 120° C., and 1 ml of a solution of stannous octoate (0.4 g) dissolved in 10 ml toluene added. The temperature was then raised to 180° C., and held there for 23 hr 20 min. At the end of the reaction period, the heat source was removed and, whilst still hot and processible, the polymer was poured into a clean metal tray sprayed with mould release agent and thereafter permitted to cool to ambient. Analysis revealed that the melt and crystallisation temperatures were:

$T_m=54°$ C.

$T_c=21°$ C.

$T_g=-54°$ C.

The polymer was derived from 92% w/w caprolactone and 8% w/w L-lactide.

The material did not inflict pain on the hand when held at a temperature around which it becomes hand-mouldable, and its solidification time was intermediate between that of Example 1 and that of Example 3, representing the best combination of properties for use as a hand mouldable material.

EXAMPLE 3

The method of Example 2 was repeated except that ε-Caprolactone (439.21 g), L-lactide (59.89 g), 1,4-butanediol (0.9012 g), and 1 ml of a solution of stannous octoate (0.3991 g) dissolved in 10 ml toluene was used, and the reaction time at 180° C. was 22 hr. Analysis revealed that the melt and crystallisation temperatures were:

$T_m=49°$ C.

$T_c=16°$ C.

$T_g=-49°$ C.

The polymer was derived from 88% w/w ε-Caprolactone and 12% w/w L-lactide.

The material was found not to inflict pain on the human hand when held at a temperature around which it becomes hand-mouldable. The material took a relatively long time to harden which it was assessed was close to the maximum that it would be desirable for use in hand mouldable materials.

COMPARISON 4

The method of Example 2 was repeated except that ε-Caprolactone (502.9 g), L-lactide (96.0 g), 1,4-butanediol (1.08 g), and 1 ml of a solution of stannous octoate (0.48 g) dissolved in 10 ml toluene was used, and the reaction time at 180° C. was 24 hr. The product obtained was a slightly pale yellow solid at room temperature. Analysis revealed that the melt and crystallisation temperatures were:

$T_m=47°$ C.

$T_c=10°$ C.

$T_g=-49°$ C.

The polymer was derived from 84% w/w ε-Caprolactone and 16% w/w L-lactide.

Although the material was safe to handle, it was extremely slow to harden so that it would not be suitable for use as a hand mouldable material.

COMPARISON 5

A commercially produced polycaprolactone, available under the trade name CAPA 650, which does not contain lactide, and is of comparable molecular weight to the polymers produced in the above Examples and Comparisons was analysed with the following results:

$T_m = 61°$ C.

$T_c = 36°$ C.

Molecular Mass $M_n = -50,000$

The material inflicted detectable pain on the human hand when held at a temperature round which it becomes hand-mouldable. The material took an extremely short time to harden which it was assessed was less than the minimum that it would be desirable for use in hand mouldable materials.

We claim:

1. A hand-moldable material having a softening temperature of less than 60° C., wherein the material comprises a thermoplastic copolymer of a lactone and a lactide in a weight ratio of from 96:4 to 87:13, respectively, wherein the copolymer has a melt temperature $T_m$ in the range of from 47 to 58° C. and a crystallisation temperature $T_c$ in the range of from 15 to 30° C.

2. A material according to claim 1 characterised in that the copolymer has a melt temperature $T_m$ in the range of from 51 to 55° C. and a crystallisation temperature $T_c$ in the range of from 19 to 25° C.

3. A material according to claim 1 characterised in that monomer a) is selected from γ, δ or ε lactones.

4. A material according to claim 3 characterised in that monomer a) comprises ε caprolactone.

5. A material according to claim 1 characterised in that monomer b) comprises L-lactide.

6. A material according to claim 1, wherein the copolymer is obtained from a lactone and lactide in a weight ratio of from 93:7 to 91:9.

7. A material according to claim 1 characterised in that the copolymer has a molecular weight of at least 30000, and preferably from 40000 to 100000.

8. A material according to claim 1 characterised in that it comprises a random copolymer.

9. A material according to claim 1 characterised in that it further comprises a pigment or colouring agent in an amount sufficient to impart colouration that is visible to the human eye.

10. A method for the selection of polymeric material for use an hand-mouldable material which is characterised by first selecting a high molecular weight copolymer of a lactone and a lactide, measuring its melt temperature $T_m$ and crystallisation temperature $T_c$ and retaining for such use material which has a melt temperature $T_m$ in the range of from 47 to 58° C. and a crystallisation temperature $T_c$ in the range of from 15 to 30° C.

11. A process for the preparation of co-polymers of a lactone and a lactide suitable for use as hand mouldable material which comprises the steps of:

(i) forming a reaction mixture from a lactone and a lactide in a weight ratio of from 96:4 to 87:13 together with an initiator (ii) introducing an esterification catalyst;

(iii) heating the reaction mixture and maintaining it at an elevated temperature until both the lactone and lactide are consumed thereby forming a polymer reaction product and (iv) cooling or allowing the reaction mixture to cool until the reaction product solidifies.

12. A process according to claim 11 characterised in that monomer a) is ε caprolactone and monomer b) comprises L-lactide.

13. A process according to claim 11 characterised in that the lactone and lactide are employed in a weight ratio of from 93:7 to 91:9.

14. A process according to claim 11 characterised in that in step (i) the chain extender is selected from diols, and preferably comprises on or more of 1,4-butanediol, diethyleneglycol, neopentylglycol.

15. A process according to claim 11 characterised in that the initiator is employed in a weight ratio to the reaction mixture of from 1:100 to 2:10000 parts and preferably from 1:1000 to 4:1000 parts.

16. A process according to claim 11 characterised in that in step (ii), the catalyst is selected from polyamines, phosphine oxides or tin carboxylates.

17. A process according to claim 16 characterised in that the catalyst is selected from triphenylphosphine oxide, 1,4-diaza(2,2,2) bicyclooctane, tetramethylbutanediamine, triethylenediamine, dibutyltin dilaurate, stannous octanoate and stannous 2-ethylhexanoate.

18. A process according to claim 11 characterised in that the catalyst is present in a weight ratio of from 4 to 15 parts per 1000 parts of the reaction mixture.

19. A process according to claim 11 characterised in that step (iii) is carried out at a temperature of above 130° C. and preferably from 150 to 190° C., whereby the product is a random copolymer.

20. A process according to claim 11 characterised in that a pigment or colouring agent is dispersed in the product of step (iii) in an amount to provide a visible colour thereto.

21. A kit comprising at least one hand-mouldable material and a set of instructions for softening and using the material characterised in that the material is in accordance with claim 1.

22. A modelling kit comprising at least two hand-mouldable materials characterised in that each material is in accordance with claim 1 at least two of the materials are differently coloured.

23. A modelling kit comprising at least one mould and at least one hand mouldable material characterised in that the material is in accordance with claim 1.

24. A kit comprising at least one hand-mouldable material and a set of instructions for softening and using the material characterised in that the material is produced by a process according to claim 11.

25. A modeling kit comprising at least two hand-mouldable materials characterised in that each material is made by a process according to claim 11 and at least two of the materials are differently coloured.

26. A modelling kit comprising at least one mould and at least one hand mouldable material characterised in that the material is produced by a process according to claim 11.

* * * * *